(12) United States Patent
Tao

(10) Patent No.: US 8,730,929 B2
(45) Date of Patent: May 20, 2014

(54) METHOD TO MAINTAIN NETWORK ADDRESS TRANSLATION (NAT) BINDING

(75) Inventor: Jianhui Tao, Beijing (CN)

(73) Assignees: Mediatek (Beijing) Inc., Beijing (CN); Hesine Technologies, Inc., Beijing (CN)

( * ) Notice: Subject to any disclaimer, the term of this patent is extended or adjusted under 35 U.S.C. 154(b) by 266 days.

(21) Appl. No.: 13/148,435

(22) PCT Filed: Jun. 9, 2010

(86) PCT No.: PCT/CN2010/073722
§ 371 (c)(1),
(2), (4) Date: Aug. 8, 2011

(87) PCT Pub. No.: WO2011/153693
PCT Pub. Date: Dec. 15, 2011

(65) Prior Publication Data
US 2012/0113966 A1    May 10, 2012

(51) Int. Cl.
*H04W 4/00* (2009.01)
*H04L 12/28* (2006.01)
*G06F 15/173* (2006.01)

(52) U.S. Cl.
USPC ............................ 370/338; 370/400; 709/223

(58) Field of Classification Search
USPC .................................. 370/338, 400; 709/223
See application file for complete search history.

(56) References Cited

U.S. PATENT DOCUMENTS

2009/0304009 A1* 12/2009 Kolhi et al. .................. 370/400
2011/0131308 A1*  6/2011 Eriksson ...................... 709/223

FOREIGN PATENT DOCUMENTS

WO    WO 2009/082296    7/2009

* cited by examiner

*Primary Examiner* — Ian N Moore
*Assistant Examiner* — Kiet Tang
(74) *Attorney, Agent, or Firm* — McClure, Qualey & Rodack, LLP

(57) ABSTRACT

A method to maintain Network Address Translation (NAT) binding is provided. The method includes: an edge NAT router mapping a source address of a data packet from a mobile terminal to the source address of the edge NAT router, and mapping a destination address of the data packet from a computing device to the destination address of the mobile terminal, and maintaining the two address mapping relationships for a first time interval; the computing device sending a heartbeat packet to the mobile terminal according to a second time interval smaller than the first time interval, so a Time To Live set value progressively decreases to 0 as the heartbeat packet reaches the edge NAT router, thereby maintaining a link from the mobile terminal to the computing device, such that the heartbeat packet will not be sent down to the handheld device.

14 Claims, 4 Drawing Sheets

METHOD TO MAINTAIN NETWORK ADDRESS TRANSLATION (NAT) BINDING

CROSS-REFERENCE TO RELATED APPLICATION

This application is a co-pending application which claims priority to PCT Application No. PCT/CN2010/073722, filed Jun. 9, 2010, entitled "Methods to Maintain Network Address Translation (NAT) Binding" herein incorporated by reference in its entirety.

FIELD OF THE INVENTION

The invention relates to a mobile terminal data communication method, and in particular, to maintaining a data link between a mobile terminal and an Internet Protocol (IP) network such as an Internet by maintaining a Network Address Translation (NAT) binding.

DESCRIPTION OF THE RELATED ART

Due to a shortage of public IP addresses and for network safety reasons, the Network Address Translation (NAT) technique has been abundantly used. NAT allows multiple computers to visit a network with no trouble by sharing one public network IP address. In order for the computers in a private network to visit outside networks, NAT is required to map an IP address and a port number of the private network to an IP address and a port number of the public network, and maintain the mapping relationship for a period of time. A timer is configured when a NAT establishes a mapping relationship. If there is no data activity before the timer reaches a time limit, the mapping relationship will be cancelled. Once the binding relationship is cancelled, it will not be possible to send the data packet from the public network side to the computing device in a private network.

Because of the properties associated with NAT, for some data applications (such as an IP phone application) which are required to maintain a real-time data link, the client software in the private network is required to exchange data packets with the server in the public network periodically, in order to renew the NAT binding. Otherwise, the server may not be able to send the IP packets to the client, causing a service interruption.

In a wireless communication environment, sending data packets to the server in the public network periodically may require a significant amount of bandwidth and battery power. Therefore, it is proposed in the present invention a new method to maintain a mapping relationship for a NAT, thereby minimizing bandwidth requirements for a handheld device and power consumption of batteries.

FIG. 1 is a diagram illustrating a current system for a mobile terminal to access a network. A handheld device 10 passes through all sorts of wireless INETs (Internet) 11 and links with the Internet (including an NAT 0 12, an INET 13, an NATN 14, an INET 15 and a computing device 16), and the handheld device 10 performs an IP (Internet Protocol) data exchange with the computing device 16 in the public network through the Internet. There are one or more NAT devices between the handheld device 10 and the computing device 16 in the public network, namely the NAT 0 and the NAT N.

When the handheld device 10 in the private network wishes to perform an IP data exchange with the computing device in the public network, the handheld device 10 is required to initiate a connection request for establishing an IP link proactively. The NAT devices will establish a mapping relationship for the IP addresses and the ports. To simplify the explanation, the IP addresses and the port numbers in the following discussion are referred to as the addresses. Assuming the private address for the handheld device is IP-p, Port-p, the NAT 0 is mapped to the address of IP-0, Port-0, and the NAT N is mapped to the address of IP-n, Port-n. From the perspective from the computing device, the address for the handheld device is IP-n, Port-n. From perspective from the NAT N, the address for the handheld device is IP-0, Port-0. From the perspective from the NAT 0, the address for the handheld device is IP-p, Port-p.

After the NAT 0 establishes a mapping relationship between IP-p, Port-p and IP-0, Port-0 and the NAT N establishes a mapping relationship between IP-0, Port-0 and IP-n, Port-n, the handheld device may exchange the IP packets with the computing device freely. However, each NAT device is configured with a timer for the mapping relationship in order to minimize the amount of resources consumed. In this regard, when there is no data activity for a predetermined amount of time (e.g. T0), the mapping relationship may be cancelled. The T0 configuration is vendor-dependent and there is no international standard. Generally, T0 is around 60 seconds for a UDP (User Datagram Protocol) packet, and T0 is slightly longer for a TCP (Transmission Control Protocol) packet. When any one of the NAT devices of the IP link removes the mapping relationships of the addresses, the computing device will not be able to send IP packets to the handheld device proactively, and the data exchange will be terminated.

In the case when NAT exists, a continuous data exchange between the handheld device 10 and the computing device 16 is required, which is crucial for real time communications such as the VoIP (voice over Internet Protocol) and the IM (instant messaging). When a UDP/IP transmission is used, a time interval required for the IP packet exchange between the handheld device and the computing device is within 60 seconds. When a TDP/IP transmission is used, the time interval required for the IP packet exchange between the handheld device and the computing device may be slightly longer. A large amount of resources may be consumed when the computing device uses TCP for a transmission.

TTL (Time to Live): A TTL is a standard field in an IP header. When a router or an NAT device receives an IP packet, the TTL value of the IP packet is always subtracted by 1 when the IP packet is rerouted. If a network device receives an IP packet with a TTL value equal to 0, the network device will discard the IP packet and the IP packet will not be rerouted.

According to known methods, a continuous data packets exchange between the handheld device and the computing device is required when it is desired to maintain a NAT mapping relationship. For a personal computer (PC), this is not a problem. However, for a handheld device, the continuous data exchange may consume scarce resources such as battery power, bandwidth, and wireless air-interface resources. Each time an IP packet is sent or received, the handheld device is required to turn on the RF (Radio Frequency) module, activate the antenna, and request for wireless air-interface resources.

BRIEF SUMMARY OF THE INVENTION

The invention is directed to methods to maintain a Network Address Translation (NAT) binding, and maintain a data link between a mobile terminal and a computing device in an IP network, such as Internet, by maintaining a network NAT binding.

Specifically, maintaining the network NAT binding is achieved by the computing device sending heartbeat packets to maintain an address mapping for the NAT binding, wherein the computing device is in an Internet.

The NAT (Network Address Translation) binding method for the present invention comprises the following steps.

Initiating, by a mobile terminal, a connection request proactively for establishing a link to a computing device via a wireless network, an edge NAT router connected to the wireless network, and one or a plurality of other routers.

Mapping a source address of a data packet from the mobile terminal to the source address of the edge NAT router, and mapping a destination address of the data packet from the computing device to the destination address of the mobile terminal, and maintaining the two address mapping relationships for a first time interval by the edge NAT router.

Sending, by the computing device, a heartbeat packet to the mobile terminal according to a second time interval which is shorter than the first time interval, so that a Time To Live (TTL) set value decreases progressively to 0 when the heartbeat packet reaches the edge NAT router, wherein the heartbeat packet sent by the computing device is used to maintain the address mapping relationships for the edge NAT router, thereby maintaining the link from the mobile terminal to the computing device.

The TTL set value of the heartbeat packet is configured by the computing device, and the TTL set value of the heartbeat packet is configured as a number of hops for the data packet to pass through all routers including the edge NAT router to reach the computing device.

The computing device configures the TTL set value of the heartbeat packet by the following steps:

Detecting a present TTL value $V1$ when the data packet from the mobile terminal is received.

Acquiring the number of the hops $V$ by subtracting the present TTL value $V1$ from a standard TTL value $V0$ of the data packet, wherein the data packet is from the mobile terminal.

Configuring the number of the hops as the TTL set value of the heartbeat packet.

Each of the routers decreases the TTL set value of the heartbeat packet by 1 when the heartbeat packet is rerouted by each of the routers on the link, the heartbeat packet is discarded since the TTL set value is progressively decreased to 0 when the data packet reaches the edge NAT router, thus the heartbeat packet only serves a purpose to maintain the address mapping relationships for the edge NAT router, such that the heartbeat packet will not be sent down to the handheld device, thereby reducing as much consumption of the battery life and wireless air-interface resources as possible.

The computing device configures the TTL set value of the heartbeat packet by the following steps.

Detecting a present TTL value when the data packet from the mobile terminal is received.

Acquiring the number of the hops $V$ by subtracting the present TTL value $V1$ from a standard TTL value $V0$ of the data packet, wherein the data packet is from the mobile terminal.

Configuring an initial TTL value $tt1$ of the heartbeat packet as the number of the hops $V$+an adjustment offset $D$.

Adjusting the initial TTL value $tt1$ of the heartbeat packet by performing a send-response communication with the mobile terminal, until acquiring a TTL value of the heartbeat packet that the mobile terminal cannot receive the heartbeat packet anymore, and use it as the TTL set value.

The send-response communication comprises: sending, by the computing device, the heartbeat packet including the initial TTL value ($tt1$) to the mobile terminal, the mobile terminal sends a response packet back after responding; then, the computing device decreases the initial TTL value of the heartbeat packet by 1 after receiving the response packet sent back by the mobile terminal; the computing device then sends the heartbeat packet including the initial TTL value decreased by 1 to the mobile terminal, the mobile terminal sends the response packet back after responding; and after that, repeating above operations of the computing device sending the heartbeat packet after decreasing the TTL value by 1 and the mobile terminal sending the response packet back after responding, until the computing device decreases the initial TTL value progressively to a value that the mobile terminal cannot receive the heartbeat packet anymore.

The mobile terminal is configured with a response module for responding and sending back a response packet.

The mobile terminal installs the response module by reading from a storage device or downloading from a network.

The NAT binding maintenance methods for the first embodiment of the invention comprises the following steps:

Initiating, by a mobile terminal, a connection request for establishing a link to a computing device via a wireless network, an edge NAT router connecting to the wireless network, and one or a plurality of other routers.

Mapping a source address of a data packet from the mobile terminal to the source address of the edge NAT router, and mapping a destination address of the data packet from the computing device to the destination address of the mobile terminal, and maintaining the two address mapping relationships for a first time interval by the edge NAT router.

Sending, by the computing device, a heartbeat packet to the mobile terminal according to a second time interval which is shorter than the first time interval, so that a Time To Live (TTL) set value progressively decreases to 0 as the heartbeat packet reaches the edge NAT router, wherein the heartbeat packet sent by the computing device is used to maintain the address mappings for the NAT router, thereby maintaining the link from the mobile terminal to the computing device.

The computing device configures the TTL set value of the heartbeat packet by following steps.

Detecting a present TTL $V1$ value when the data packet sent from the mobile terminal is received.

Acquiring a number of hops by subtracting the present TTL value $V1$ from a standard TTL value $V0$ of the data packet, wherein the data packet is from the mobile terminal.

Configuring the number of the hops as the TTL set value of the heartbeat packet.

The NAT binding maintenance methods for the first embodiment of the invention comprises the following steps: initiating, by a mobile terminal, a connection request for establishing a link to a computing device via a wireless network, an edge NAT router connected to the wireless network, and one or a plurality of other routers; mapping a source address of a data packet of the mobile terminal to the source address of the edge NAT router, and mapping a destination address of the data packet of the computing device to the destination address of the mobile terminal, and maintaining the two address mapping relationships for a first time interval by the edge NAT router; and sending, by the computing device, a heartbeat packet to the mobile terminal according to a second time interval which is shorter than the first time interval, so that a Time To Live (TTL) set value progressively decreases to 0 as the heartbeat packet reaches the edge NAT router, wherein the heartbeat packet sent by the computing device is used to maintain the address mapping relationships for the NAT router, thereby maintaining the link from the mobile terminal to the computing device. The computing device configures the TTL set value of the heartbeat packet by the following steps.

Detecting a present TTL value V1 when the data packet from the mobile terminal is received.

Acquiring a number of hops V by subtracting the present TTL value from a standard TTL value of the data packet, wherein the data packet is from the mobile terminal.

Configuring an initial TTL value tt1 of the heartbeat packet as the number of the hops+an adjustment offset.

Adjusting the initial TTL value tt1 of the heartbeat packet by performing a send-response communication with the mobile terminal, until acquiring a TTL value of the heartbeat packet that the mobile terminal cannot receive the heartbeat packet anymore, and use it as the TTL set value.

The send-response communication comprises the computing device sending the heartbeat packet including the initial TTL value to the mobile terminal, the mobile terminal sends a response packet back after responding; the computing device decreasing the initial TTL value of the heartbeat packet by 1 after receiving the response packet sent back by the mobile terminal; the computing device sending the heartbeat packet including the initial TTL value decreased by 1 to the mobile terminal, the mobile terminal sending the response packet back after responding; after that, repeating above operations of the computing device sending the heartbeat packet after decreasing the TTL value by 1 and the mobile terminal sending the response packet back after responding, until the computing device decreases the initial TTL value progressively to a value that the mobile terminal cannot receive the heartbeat packet anymore.

In the above methods, the mobile terminal sends the data packet to the computing device according to an interval that is greater than the first time interval, thereby the computing device acquires the TTL value adapted for accidents including a broken adaptation link or a route change.

Methods provided above may be used to maintain a NAT address, and mapping relationship, and solves the technical issue of the handheld device having to receive and send IP packets frequently with current techniques.

A detailed description is given in the following embodiments with reference to the accompanying drawings.

DETAILED DESCRIPTION OF THE INVENTION

Figure 1:
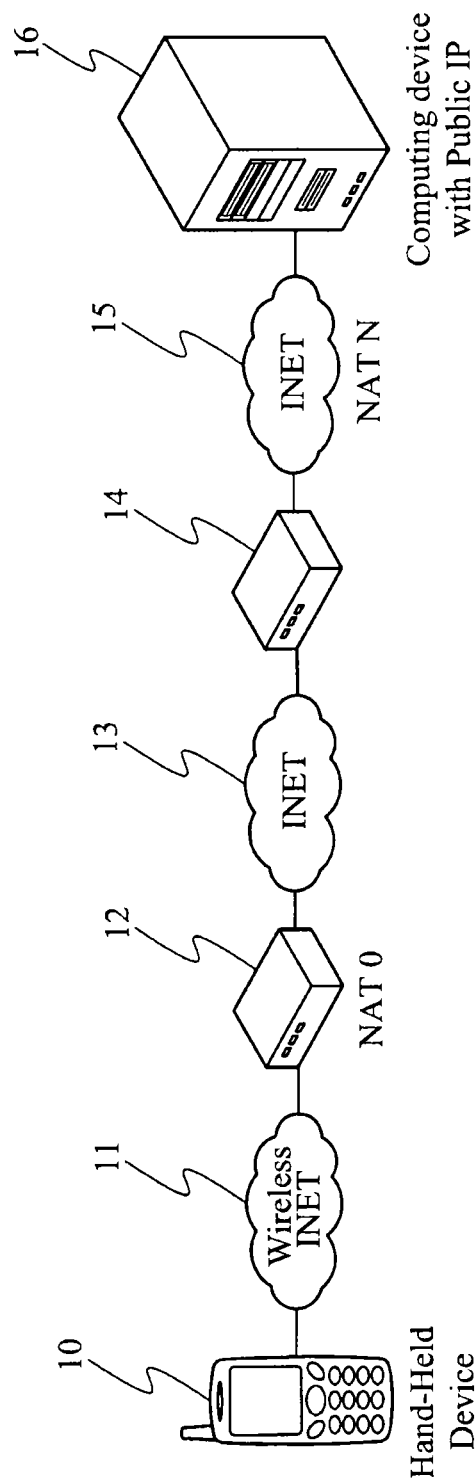
FIG. 1 is a diagram illustrating a current system for a mobile terminal to access a network.

The principle of the present invention is that after an IP link is established between the handheld device and the computing device, the computing device sends a specific IP packet (referred to as a "heartbeat packet" hereafter) periodically (Tp), wherein Tp is smaller than T1 for all of the NAT devices between the handheld device and the computing device. The TTL value for the specific heartbeat packet is configured to a specific value which equals to the number of the hops between the handheld device and the computing device. The heartbeat packet is configured in a way that the TTL value becomes 0 as the NAT 0 receives the specific heartbeat packet, thus the NAT 0 will discard the heartbeat packet and not send the heartbeat packet to the handheld device. As a result, the wireless resource of the handheld device is guaranteed to be prevented from being activated, and the handheld device may save battery power and bandwidth usage, and wireless air-interface resources. Before the T1 timer of the NAT device reaches a time limit, the NAT device may receive a heartbeat packet from the computing device to the handheld device, such that the NAT device connecting to the wireless Internet and all of the other NAT devices on the link may keep the IP mapping relationship for the handheld device, thus the computing device 16 may still send normal IP packets (or the data packets) to the handheld device.

The heartbeat packet of the present invention may also be referred to as a NAT binding packet. The format of the NAT binding packet follows the data packet format for the transmission between the handheld device and the computing device, with the exception that the TTL set value of the NAT binding packet is configured by the computing device according to the number of the hops. In another embodiment, a binding identity for a NAT binding may be configured for the heartbeat packet or the NAT binding packet.

No particular process is performed for the TTL value of the normal IP packets exchanged between the handheld device and the computing device for the present invention.

Specifically, the number of the hops is acquired by methods described at below.

The computing device requires knowledge of the number of the hops between the handheld device and the computing device when a heartbeat packet is sent by the computing device, wherein the steps for acquiring the knowledge are as follows:

1. When the handheld device sends an IP packet to the computing device, the application data (not the IP, TCP or UDP header) may include a new data attribute, the TTL value V0. The TTL value V0 is a TTL value for the IP packet sent by the handheld device (e.g. 64).

2. When the IP packet from the handheld device is received by the computing device, the computing device detects the IP header of the IP packet for a present TTL value V1.

3. When the number of the hops between the handheld device and the computing device is V0−V1, the TTL value for the heartbeat packet will be configured as tt1=V0−V1.

Since there is no universal standard for the NAT devices from different vendors, it is not very reliable to configure the TTL value as V0−V1. Therefore, the following methods may be used to acquire the number of the hops:

1. When the handheld device sends an IP packet to the computing device for the first time (e.g. registration), the computing device may initialize the TTL value of the heartbeat packet as an initial TTL value tt1=V0−V1+D, wherein D may be set to a value around 5, for example, 2~7.

2. The handheld device sends back a heartbeat packet with a normal TTL value (e.g. 64) after the heartbeat packet from the computing device is received.

3. If the computing device receives the heartbeat packet from the handheld device, the computing device will subtract 1 from initial TTL value tt1 for the next heartbeat packet.

4. After few rounds of sending the heartbeat packet between the computing device and the handheld device, the computing device may configure a precise initial TTL value tt1 to guarantee that the TTL value of the heartbeat packet becomes 1 when the heartbeat packet reaches the NAT 0, such that the heartbeat packet will be discarded by the NAT-0.

In the case of VoIP, IM, or other real time messaging services when NAT exists, the handheld device is required to send an IP packet proactively to the computing device every 60 seconds in order to maintain the mapping relationship for the NAT devices. This is equivalent to a proactive call initiation every 60 seconds, which may consume enormous amounts of the wireless air-interface resources and battery power of the handheld device.

By using the method of the present invention, the handheld device or the mobile device is not required to maintain the mapping relationship for the NAT devices by sending IP packets periodically. However, due to complexity of the wireless data links, the wireless connection for a handheld device may be disconnected completely without being detected by the computing device. Therefore, the handheld device is still required to send an IP packet to the computing device periodically (e.g. T1) to update the IP link. The amount of the time interval T1 is far greater than the time interval Tp for the heartbeat packet from the computing device. For a UDP/IP connection, Tp may be measured as 20 seconds while T1 may be measured as 20 minutes. A specific number for Tp and T1 may be decided by the implementer.

Figure 2:
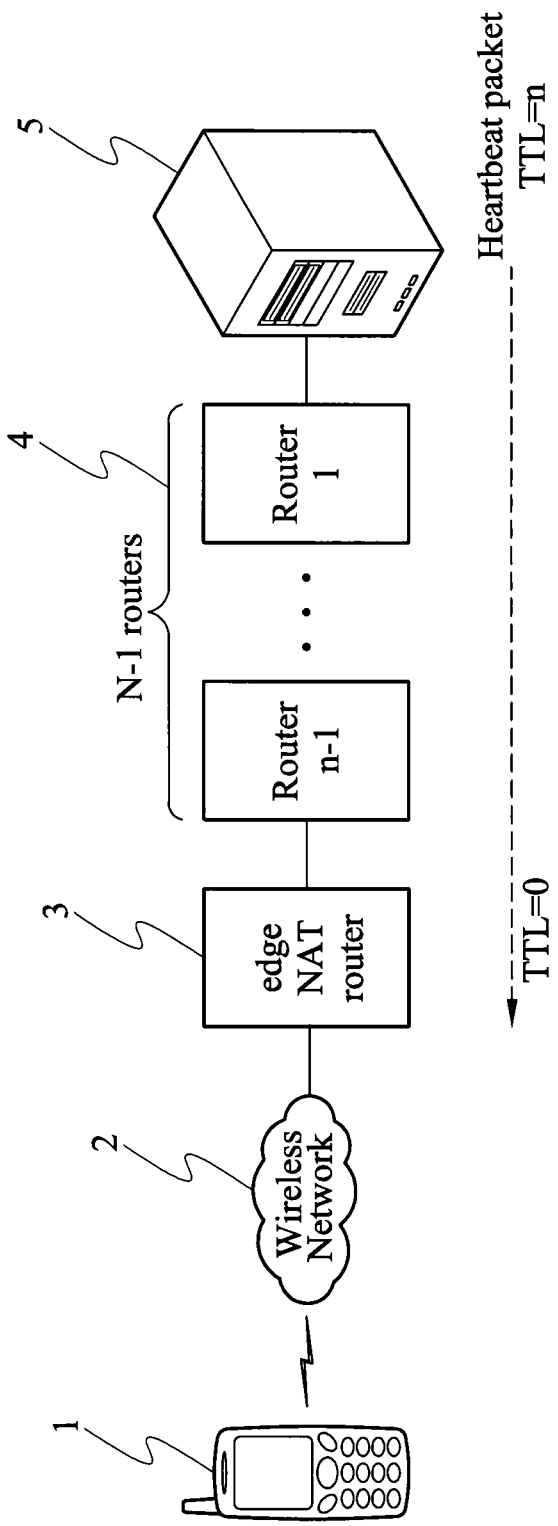
FIG. 2 is a diagram illustrating a system for realizing the NAT binding maintenance method for an embodiment of the invention.

FIG. 2 is a diagram illustrating a system for realizing the NAT binding maintenance method for an embodiment of the invention. In the following, the method of the present invention is explained with reference to FIG. 2.

In FIG. 2, the mobile terminal 1 may be a GPRS (General Packet Radio Service) phone, a TD-SCDMA (Time Division-Synchronous Code Division Multiple Access) phone, a WCDMA (Wideband Code Division Multiple Access) phone, a CDMA2000 (Code Division Multiple Access 2000) phone, a WIFI (Wireless Fidelity) phone, or a WiMAX (Worldwide Interoperability for Microwave Access) phone. The wireless network 2 may be a wireless network adapted to work with the phones described at the above. The computing device 5 may be a server or a computer in an IP network, and the mobile terminal 1 may establish a data link to the computing device 5 by proactively initiating a connection request to the computing device 5. The edge NAT router 3 is a router configured with a NAT program or a NAT module connecting to the wireless network 2. The edge NAT router 3 may map the source address of a data packet to its own source address, wherein the data packet is sent by the mobile terminal 1 to the computing device 5. The edge NAT router 3 may also map the destination address of the data packet sent from the computing device 5 to the destination address of the mobile terminal. For example, the edge NAT router 3 maps the source IP address of a data packet from the mobile terminal 1: TCP source port 192.168.0.3:30000 to its own source IP address: TCP source port 172.28.1.5:40001, and maps the destination IP address of the data packet from the computing device 5: TCP destination port 172.28.1.5:40001 to the destination IP address of the mobile terminal 1: TCP destination port 192.168.0.3:30000. The edge NAT router 3 maintains the address mapping within a certain period of time, such as 60 seconds, wherein the address mapping relationship will be removed by the NAT program or the NAT module if a data packet is not received from the mobile terminal 1 or the computing device 5 within this period of time, thereby disconnecting the data link from the mobile terminal 1 to the computing device 5. The data link may be established via several NAT routers 4. Therefore, it is indicated in FIG. 2 the n−1 other routers. According to the system illustrated in FIG. 2, the NAT binding maintenance method for the present invention is explained in detail as follows.

First, the mobile terminal 1 initiates a connection request for establishing a link to the computing device 5 via the wireless network 2, the edge NAT router 3 connecting to the wireless network 2, and one or a plurality of other routers 4.

The edge NAT router 3 maps the source address (e.g. including source IP address and source TCP port) of a data packet from the mobile terminal 1 to the source address of the edge NAT router 3, and maps the destination address (e.g. including destination IP address:destination TCP port) of the data packet from the computing device 5 to the destination address of the mobile terminal, and the edge NAT router 3 maintains the mapping relationship of the 2 addresses for a first time interval T1, such as 60 seconds.

According to a second time interval T2 (e.g. 55 seconds), which is shorter than the first time interval T1, the computing device 5 sends a heartbeat packet to the mobile terminal 1, so that a TTL set value of the heartbeat packet progressively decreases to 0 as the heartbeat packet reaches the edge NAT router 3, wherein the heartbeat packet sent by the computing device 5 is used to maintain the address mapping relationship for the NAT router 3, thereby maintaining the link from the mobile terminal 1 to the computing device 5.

The computing device 5 may configure the TTL set value of the heartbeat packet as a number of hops for the data packet to pass through all the routers including the edge NAT router 3 and reach the computing device 5. As indicated in FIG. 2, a data packet is required to pass through n routers (n−1 routers 4 and an edge NAT router 3) to reach the computing device 5, thus the computing device 5 may configure the TTL set value as n. For example, if n equals 10, the TTL set value is also configured to be 10.

It is to be understood that the TTL set value configured by the computing device 5 is the final TTL value configured by the computing device. The initial TTL value configured by the computing device 5 in the following discussion is the initial configured TTL value.

The computing device 5 may configure the TTL value for the heartbeat packet by the following steps.

When receiving the data packet from the mobile terminal 1, a present TTL value V1 (e.g. 54) is detected in the header of the data packet.

The number of the hops (e.g. 10) is acquired by subtracting the present TTL value V1 (54) from the standard TTL value V0 (e.g. V0=64) of the data packet from the mobile terminal.

Finally, the number of the hops is configured as the TTL set value of the heartbeat packet (e.g. 10).

When the heartbeat packet is rerouted by each router on the link, each router decreases the TTL set value of the heartbeat packet by 1, such that the heartbeat packet is discarded when the data packet reaches the edge NAT router 3 due to the TTL set value of the heartbeat packet being progressively decreased to 0, thus the heartbeat packet only serves a purpose to maintain the address mapping relationship for the edge NAT router 3. As described previously, when the data link is established from the mobile terminal 1 to the computing device 5 via 10 routers, and the TTL set value of the heartbeat packet sent by the computing device 5 is 10, the TTL set value is progressively decreased to 0 by the time the heartbeat packet reaches the edge NAT router 3, and the heartbeat packet is discarded by the edge NAT router 3. However, the data activity for the heartbeat packet in the router 3 is handled by the router 3, thereby extending the address mapping relationship for the edge NAT router 3 for another first time interval T1, such as 60 seconds.

The computing device 5 may also configure the TTL set value of the heartbeat packet by using the following steps.

Detecting the present TTL value V1 (e.g. 54) when the data packet from the mobile terminal 1 is received Acquiring the number of the hops V (e.g. 10) by subtracting the present TTL value V1 from the standard TTL value V0 (e.g. 64) of the data packet from the mobile terminal 1.

Configuring the initial TTL value tt1 (e.g. 13) of the heartbeat packet as the number of the hops V+the adjustment offset D.

finally, adjusting the initial TTL value tt1 of the heartbeat packet by performing a send-response communication with the mobile terminal 1 until acquiring a TTL value that the mobile terminal 1 cannot receive the heartbeat packet anymore, and use it as the TTL set value of the heartbeat packet.

Specifically, the send-response communication between the computing device 5 and the mobile terminal 1 comprises the following steps.

The computing device 5 sends a heartbeat packet with the initial TTL value tt1 (e.g. 13) to the mobile terminal 1, the mobile terminal 1 sends a response packet back after responding to the heartbeat packet.

After the computing device 5 receives the response packet sent back by the mobile terminal 1, the computing device 5 decreases the initial TTL value tt1 of the heartbeat packet by 1 (13−1=12).

Then, the computing device 5 sends the heartbeat packet with the initial TTL value tt1 decreased by 1 (e.g. 12) to the mobile terminal 1, the mobile 1 sends a response packet back again after responding;

Subsequently, the above operations of the computing device 5 sending the heartbeat packet after decreasing the TTL value by 1 and the mobile terminal 1 responding by sending a response packet back, until the computing device 5 decreases the initial TTL value tt1 progressively to a value where the mobile terminal 1 cannot receive the heartbeat packet anymore (for example, the computing device 5 decreases the TTL value of the heartbeat packet several times, until the initial TTL value is progressively decreased from 13 to 10, and the TTL value of the heartbeat packet becomes 0, TTL=0, by the time the heartbeat packet reaches the edge NAT router 3 and the minus 1 operation is performed to the heartbeat packet. Therefore, the heartbeat packet may not be rerouted to the mobile terminal 1, and the mobile terminal 1 may not receive the heartbeat packet.

In order for the mobile terminal 1 to be able to respond to the heartbeat packet sent by the computing device 5, the mobile terminal 1 should be configured with a response module (not shown in the figure) for responding and sending back a response packet. The mobile terminal 1 may install the response module by reading the response module from a storage device or downloading the response module from a network.

Figure 3:
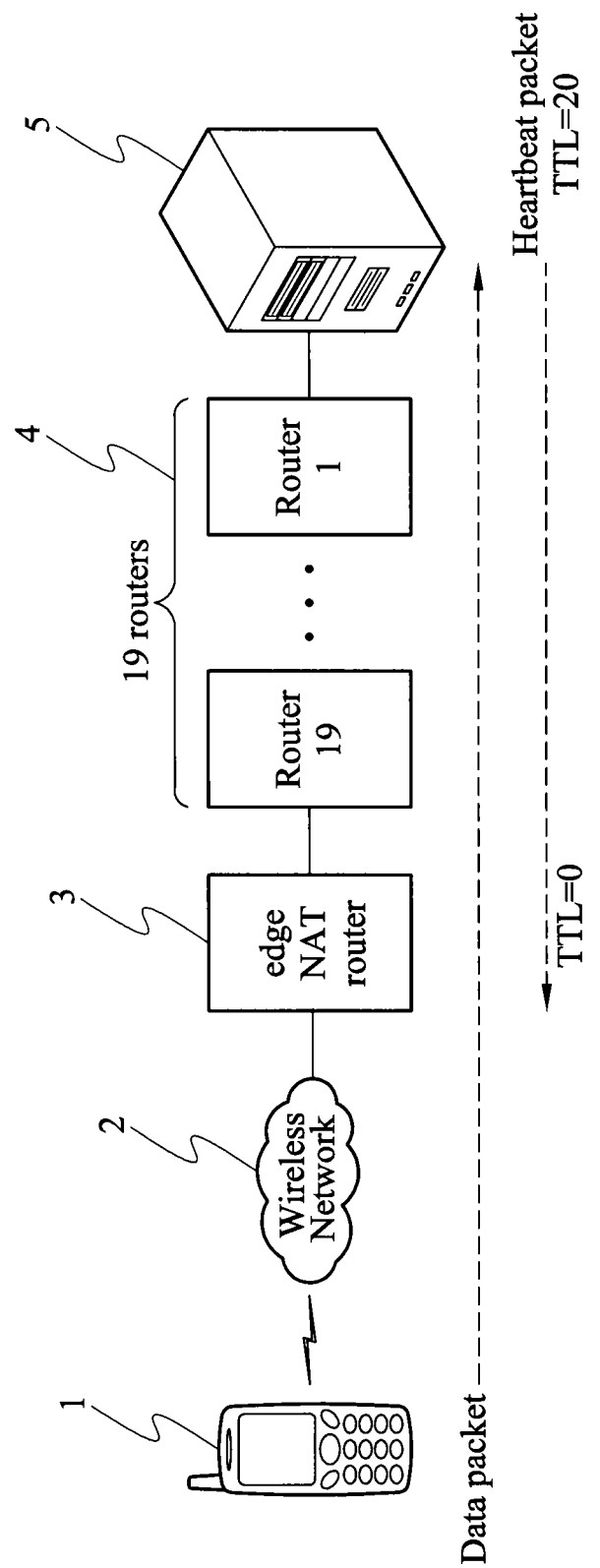
FIG. 3 is a diagram illustrating the NAT binding maintenance method for a first embodiment of the invention.
Figure 4:
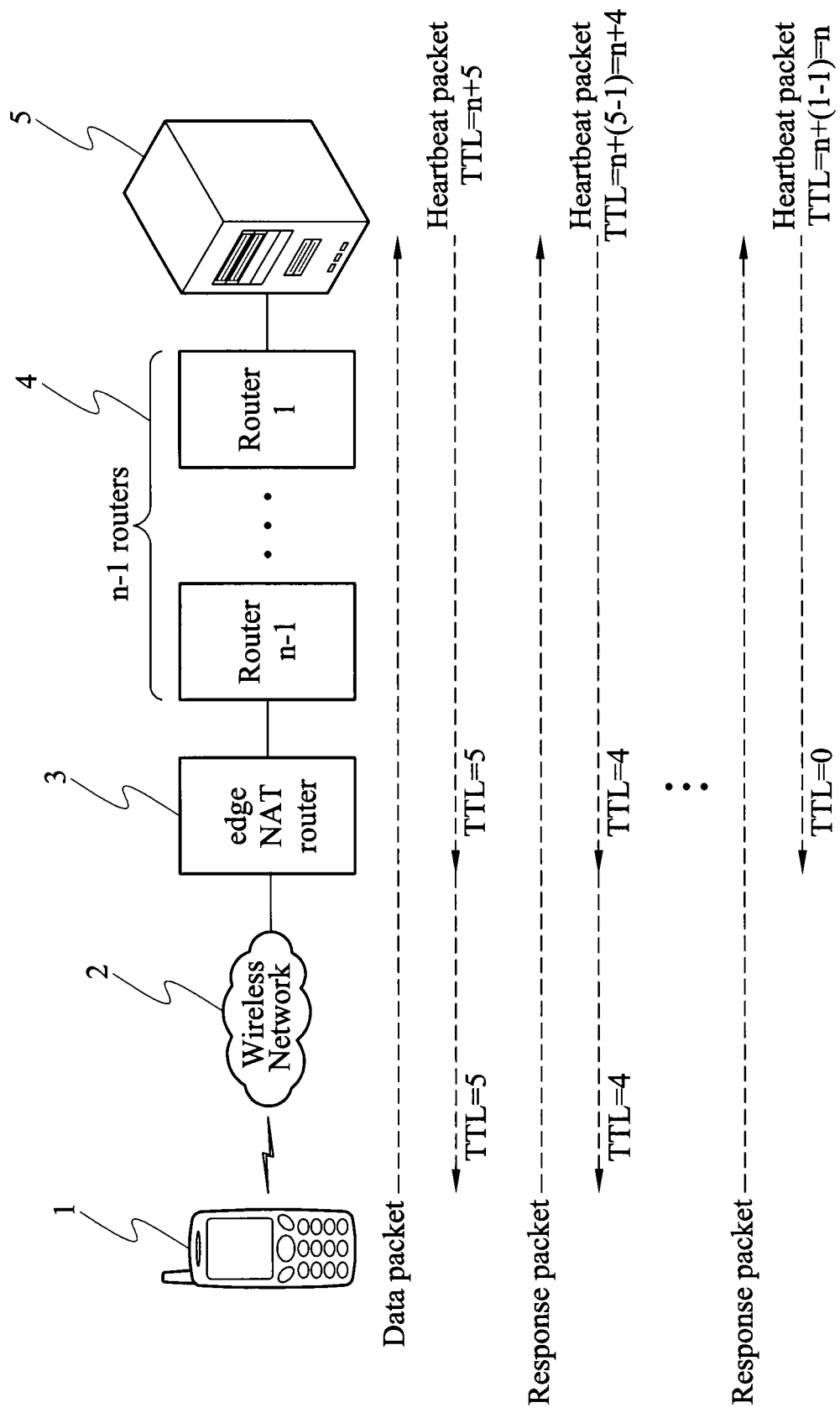
FIG. 4 is a diagram illustrating the NAT binding maintenance method for a second embodiment of the invention.

FIG. 3 and FIG. 4 are diagrams illustrating the NAT binding maintenance method for a first embodiment and a second embodiment of the invention. In the following, the NAT binding maintenance methods for the first and second embodiments of the invention are explained with reference to FIG. 3 and FIG. 4.

In the first embodiment illustrated in FIG. 3, the mobile terminal 1 firstly establishes a data link to the computing device 5 by proactively initiating a connection request to the computing device 5 via the wireless network 2, the edge NAT router 3 connecting to the wireless network 2, and one or a plurality of other routers 4. Then, the edge NAT router 3 maps the source address of the data packet from the mobile terminal 1 to the source address of the edge NAT router 3, and maps the destination address of the data packet from the computing device 5 to the destination address of the mobile terminal, and the edge NAT router 3 maintains the two address mapping relationships for a first time interval T1. Then, the computing device 5 sends a heartbeat packet to the mobile terminal 1 according to a second time interval T2 which is shorter than the first time interval T1, so that the TTL value progressively decreases to 0 as the heartbeat packet reaches the edge NAT router 3, using the heartbeat packet sent by the computing device 5 to maintain the address mapping relationship for the edge NAT router 3, thereby the link from the mobile terminal 1 to the computing device 5 may be maintained. The computing device 5 may configure the TTL value by using the following steps.

Detecting the present TTL value V1 when receiving the data packet from the mobile terminal 1.

Acquiring the number of the hops by subtracting the present TTL value V1 from the standard TTL value V0 of the data packet from the mobile terminal.

Configuring the number of the hops as the TTL value of the heartbeat packet.

For example, in the first embodiment illustrated in FIG. 3, assume that the standard TTL value V0 of the data packet is V0=64, and the data packet reaches the computing device 5 via the edge NAT router 3 and 19 other routers. According to the rule of subtracting the TTL value of the data packet by 1 when the data packet is rerouted at each router, the computing device 5 will detect the present TTL value V1 as 62−20=44 when the computing device 5 receives the data packet from the mobile terminal 1. Then, the computing device 5 acquires the number of the hops of 20 by subtracting the present TTL value V1 from the standard TTL value V0 (64−44=20). And finally, the computing device 5 configures the TTL set value of the heartbeat packet as 20.

In the second embodiment illustrated in FIG. 4, the mobile terminal 1 establishes a data link to the computing device 5 by proactively initiating a connection request to the computing device 5 via the wireless network 2, the edge NAT router 3 connecting to the wireless network 2, and one or a plurality of other routers 4. Then, the edge NAT router 3 maps the source address of the data packet from the mobile terminal 1 to the source address of the edge NAT router 3, and maps the destination address of the data packet from the computing device 5 to the destination address of the mobile terminal, and maintains the two address mapping relationships for a first time interval T1. The computing device 5 sends a heartbeat packet to the mobile terminal 1 according to a second time interval T2 which is shorter than the first time interval T1, so that a TTL set value of the heartbeat packet progressively decreases to 0 as the heartbeat packet reaches the edge NAT router 3, the heartbeat packet sent by the computing device 5 is used to maintain the mapping relationship of the source addresses and the mapping relationship of the destination addresses for the NAT router 3, thereby the link from the mobile terminal 1 to the computing device 5 may also be maintained. The computing device 5 configures the TTL set value of the heartbeat by using the following steps.

Detecting the present TTL value V1 when receiving the data packet from the mobile terminal 1.

Acquiring the number of the hops V by subtracting the present TTL value V1 from the standard TTL value V0 of the data packet from the mobile terminal.

Configuring the initial TTL value tt1 of the heartbeat packet as the number of the hops V+the adjustment offset D.

Adjusting the initial TTL value tt1 of the heartbeat packet by performing a send-response communication continually with the mobile terminal 1 until acquiring a TTL value that the mobile terminal 1 cannot receive the heartbeat packet anymore, and use as the TTL set value of the heartbeat packet.

The adjustment offset D described previously may be configured as a value between 2~7, wherein 5 may have a higher priority.

Specifically, the send-response communication between the computing device 5 and the mobile terminal 1 comprises the following steps:

First, the computing device 5 sends the heartbeat packet to the mobile terminal 1, the mobile terminal 1 sends a response packet back after responding, wherein the heartbeat packet includes the initial TTL value tt1.

After the computing device 5 receives the response packet sent back by the mobile terminal 1, the computing device 5 decreases the initial TTL value tt1 of the heartbeat packet by 1.

The computing device then sends the heartbeat packet including the initial TTL value tt1 decreased by 1 to the mobile terminal 1, the mobile 1 sends the response packet back again after responding;

repeat above operations of the computing device 5 sending the heartbeat packet after decreasing the TTL value by 1 and the mobile terminal 1 responding and sending response packets back, until the computing device 5 decreases the initial TTL value tt1 progressively to a value where the mobile terminal 1 cannot receive the heartbeat packet anymore.

For example, the adjustment offset D in FIG. 4 has a value of 5, when the computing device 5 receives a first response packet corresponding to the heartbeat packet from the mobile terminal 1, the computing device 5 decreases the TTL value (the initial TTL value) by 1 and sends the heartbeat packet with the TTL value=n+4. When the computing device 5 receives the second response packet corresponding to the heartbeat packet from the mobile terminal 1, the computing device 5 further subtracts 1 from the TTL value (the initial TTL value) that has already been subtracted by 1 and sends the heartbeat packet with the TTL value=n+3. When the computing device 5 receives the third response packet corresponding to the heartbeat packet from the mobile terminal 1, the computing device 5 further subtracts 1 from the TTL value (the initial TTL value) that has already been subtracted by 2 and sends the heartbeat packet with the TTL value=n+2. When the computing device 5 receives the fourth response packet corresponding to the heartbeat packet from the mobile terminal 1, the computing device 5 further subtracts 1 from the TTL value (the initial TTL value) that has already been subtracted by 3 and sends the heartbeat packet with the TTL value=n+1. When the computing device 5 receives the fifth response packet corresponding to the heartbeat packet from the mobile terminal 1, the computing device 5 further subtracts 1 from the TTL value (the initial TTL value) that has already been subtracted by 4 and sends the heartbeat packet with the TTL value=n. The TTL value is progressively decreased to 0 by the time the heartbeat packet reaches the edge NAT router 3 and the heartbeat packet is discarded. Thus, the mobile terminal 1 cannot respond since the mobile terminal 1 does not receive the heartbeat packet.

The mobile terminal 1 is configured with a response module for responding and sending back the response packet, the mobile terminal 1 installs the response module by reading from a storage device or downloading from a network.

When the mobile terminal 1 receives the heartbeat packet from the computing equipment, the response module creates and sends back a response packet including a NAT binding identity according to a NAT binding identity in the heartbeat packet. The computing device 5 may identify the response packet according to the NAT binding identity and decrease the initial TTL value (the TTL value) by 1. The TTL value in the response packet may be the same as a standard TTL value for an ordinary data packet sent by the mobile terminal 1.

Since links may be broken due to accidents and number of routers rerouting the data packets may vary, the mobile terminal 1 may send the data packet to the computing device 5 according to a time interval that is greater than the first time interval T1 (e.g. 20 minutes). Thus the computing device 5 may repeat the above mentioned steps for NAT binding to acquire the TTL value of the heartbeat packet adapted for accidents such as broken links or change of routing.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed:

1. A NAT (Network Address Translation) binding method for maintaining a NAT binding by a computing device connected with a mobile terminal via a wireless network, an edge NAT router connected to the wireless network, and one or a plurality of other routers between the edge NAT router and the computing device, the NAT binding method comprising:

sending a heartbeat packet to the edge NAT router according to a second time interval shorter than a first time interval, to maintain address mapping relationships for the mobile terminal in the edge NAT router, thereby maintaining a link between the mobile terminal and the computing device, wherein the address mapping relationships for the mobile terminal are configured to be maintained by the edge NAT router for the first time interval, and a Time To Live (TTL) set value of the heartbeat packet progressively decreases to 0 as the heartbeat packet reaches the edge NAT router, receiving a data packet from the mobile terminal according to a third time interval that is greater than the first time interval, thus the computing device reconfigures the TTL value due to broken link or change of routing, receiving a data packet from the mobile terminal prior to sending the heartbeat packet, wherein the address mapping relationships for the mobile terminal comprises information concerning a mapping of a source address of the data packet to a source address of the edge NAT router and a mapping of a destination address of the data packet to a destination address of the mobile terminal, detecting a present TTL value of the data packet when receiving the data packet;

acquiring the number of the hops by subtracting the present TTL value from a standard TTL value of the data packet;

configuring an initial TTL value of the heartbeat packet to an addition result of the number of the hops and an adjustment offset; and adjusting the initial TTL value of the heartbeat packet by performing a send-response communication with the mobile terminal, until acquiring a TTL value of the heartbeat packet that the mobile terminal cannot receive the heartbeat packet, thereby using the TTL value as the TTL set value, wherein the send-response communication comprises:

sending, by the computing device, the heartbeat packet including the initial TTL value to the mobile terminal;

sending, by the mobile terminal, a response packet back to the computing device in response to receiving the heartbeat packet;

decreasing, by the computing device, the initial TTL value of the heartbeat packet by 1 after receiving the response packet; and repeating, by the computing device, the steps of sending the heartbeat packet and decreasing the initial TTL value of the heartbeat packet, until no response packet corresponding to the sent heartbeat packet is received from the mobile terminal.

2. The NAT binding method as claimed in claim 1, further comprising configuring the TTL set value of the heartbeat packet to a number of hops for the data packet to pass through the edge NAT router and the other routers and reach the computing device, prior to sending the heartbeat packet.

3. The NAT binding method as claimed in claim 2, further comprising detecting a present TTL value of the data packet when receiving the data packet, and acquiring the number of the hops by subtracting the present TTL value from a standard TTL value of the data packet.

4. The NAT binding method as claimed in claim 3, wherein each of the other routers decreases the TTL set value of the heartbeat packet by 1 when rerouting the heartbeat packet on the link, and the heartbeat packet is discarded by the edge NAT router in response to the TTL set value being decreased progressively to 0 when the data packet reaches the edge NAT router, so that the heartbeat packet only serves a purpose to maintain the address mapping relationships for the mobile terminal in the edge NAT router.

5. A computing device for NAT (Network Address Translation) binding maintenance, wherein the computing device is connected with a mobile terminal via a wireless network, an edge NAT router connected to the wireless network, and one or a plurality of other routers between the edge NAT router and the computing device, the computing device comprising:
a processing unit, sending a heartbeat packet to the edge NAT router according to a second time interval shorter than a first time interval, to maintain address mapping relationships for the mobile terminal in the edge NAT router, thereby maintaining a link between the mobile terminal and the computing device, wherein the address mapping relationships for the mobile terminal are configured to be maintained by the edge NAT router for the first time interval, and a Time To Live (TTL) set value of the heartbeat packet progressively decreases to 0 as the heartbeat packet reaches the edge NAT router, and
receiving a data packet from the mobile terminal according to a third time interval that is greater than the first time interval, thus the computing device reconfigures the TTL value due to broken link or change of routing,
wherein the processing unit further:
receives a data packet from the mobile terminal prior to sending the heartbeat packet, wherein the address mapping relationships for the mobile terminal comprises information concerning a mapping of a source address of the data packet to a source address of the edge NAT router and a mapping of a destination address of the data packet to a destination address of the mobile terminal,
detects a present TTL value of the data packet when receiving the data packet;
acquires the number of the hops by subtracting the present TTL value from a standard TTL value of the data packet;
configures an initial TTL value of the heartbeat packet to an addition result of the number of the hops and an adjustment offset; and
adjusts the initial TTL value of the heartbeat packet by performing a send-response communication with the mobile terminal, until acquiring a TTL value of the heartbeat packet that the mobile terminal cannot receive the heartbeat packet, thereby using the TTL value as the TTL set value,
wherein the send-response communication comprises:
sending, by the computing device, the heartbeat packet including the initial TTL value to the mobile terminal;
sending, by the mobile terminal, a response packet back to the computing device in response to receiving the heartbeat packet;
decreasing, by the computing device, the initial TTL value of the heartbeat packet by 1 after receiving the response packet; and
repeating, by the computing device, the steps of sending the heartbeat packet and decreasing the initial TTL value of the heartbeat packet, until no response packet corresponding to the sent heartbeat packet is received from the mobile terminal.

6. The computing device as claimed in claim 5, wherein the processing unit further configures the TTL set value of the heartbeat packet to a number of hops for the data packet to pass through the edge NAT router and the other routers and reach the computing device, prior to sending the heartbeat packet.

7. The computing device as claimed in claim 6, wherein the processing unit further detects a present TTL value of the data packet when receiving the data packet, and acquires the number of the hops by subtracting the present TTL value from a standard TTL value of the data packet.

8. The computing device as claimed in claim 7, wherein each of the other routers decreases the TTL set value of the heartbeat packet by 1 when rerouting the heartbeat packet on the link, and the heartbeat packet is discarded by the edge NAT router in response to the TTL set value being decreased progressively to 0 when the data packet reaches the edge NAT router, so that the heartbeat packet only serves a purpose to maintain the address mapping relationships for the mobile terminal in the edge NAT router.

9. A NAT (Network Address Translation) binding method for maintaining a NAT binding by a mobile terminal connected to a computing device via a wireless network, an edge NAT router connected to the wireless network, and one or a plurality of other routers between the edge NAT router and the computing device, the NAT binding method comprising:
preparing a data packet comprising a packet header and application data, wherein the packet header comprises a standard Time To Live (TTL) value and the application data comprises an attribute storing the standard TTL value;
sending the data packet to the computing device, so that the computing device configures a TTL set value of a heartbeat packet according to the standard TTL value of the data packet, and sends the heartbeat packet to the edge NAT router according to a second time interval shorter than a first time interval in which address mapping relationships for the mobile terminal are to be maintained by the edge NAT router, wherein the TTL set value of the heartbeat packet progressively decreases to 0 as the heartbeat packet reaches the edge NAT router, thereby maintaining the address mapping relationships for the mobile terminal in the edge NAT router;
sending a data packet to the computer device according to a third time interval that is greater than the first time interval, thus the computing device reconfigures the TTL value due to broken link or change of routing,
receiving a data packet from the mobile terminal prior to sending the heartbeat packet, wherein the address mapping relationships for the mobile terminal comprises information concerning a mapping of a source address of the data packet to a source address of the edge NAT router and a mapping of a destination address of the data packet to a destination address of the mobile terminal,
detecting a present TTL value of the data packet when receiving the data packet;

acquiring the number of the hops by subtracting the present TTL value from a standard TTL value of the data packet;

configuring an initial TTL value of the heartbeat packet to an addition result of the number of the hops and an adjustment offset; and adjusting the initial TTL value of the heartbeat packet by performing a send-response communication with the mobile terminal, until acquiring a TTL value of the heartbeat packet that the mobile terminal cannot receive the heartbeat packet, thereby using the TTL value as the TTL set value, wherein the send-response communication comprises:

sending, by the computing device, the heartbeat packet including the initial TTL value to the mobile terminal;

sending, by the mobile terminal, a response packet back to the computing device in response to receiving the heartbeat packet;

decreasing, by the computing device, the initial TTL value of the heartbeat packet by 1 after receiving the response packet; and repeating, by the computing device, the steps of sending the heartbeat packet and decreasing the initial TTL value of the heartbeat packet, until no response packet corresponding to the sent heartbeat packet is received from the mobile terminal.

10. The NAT binding method as claimed in claim 9, wherein the TTL set value of the heartbeat packet is configured to a number of hops for the data packet to pass through the edge NAT router and the other routers and reach the computing device.

11. The NAT binding method as claimed in claim 9, wherein each of the other routers decreases the TTL set value of the heartbeat packet by 1 when rerouting the heartbeat packet, and the heartbeat packet is discarded by the edge NAT router in response to the TTL set value being decreased progressively to 0 when the data packet reaches the edge NAT router, so that the heartbeat packet only serves a purpose to maintain the address mapping relationships for the mobile terminal in the edge NAT router.

12. A mobile terminal for NAT (Network Address Translation) binding maintenance, wherein the mobile terminal is connected to a computing device via a wireless network, an edge NAT router connected to the wireless network, and one or a plurality of other routers between the edge NAT router and the computing device, the mobile terminal comprising:

a processing unit, preparing a data packet comprising a packet header with a standard Time To Live (TTL) value and comprising application data with an attribute storing the standard TTL value, and sending the data packet to the computing device, so that the computing device configures a TTL set value of a heartbeat packet according to the standard TTL value of the data packet, and sends the heartbeat packet to the edge NAT router according to a second time interval shorter than a first time interval in which address mapping relationships for the mobile terminal are to be maintained by the edge NAT router, wherein the TTL set value of the heartbeat packet progressively decreases to 0 as the heartbeat packet reaches the edge NAT router, thereby maintaining the address mapping relationships for the mobile terminal in the edge NAT router; and sending data packet to the computer device according to a third time interval that is greater than the first time interval, thus the computing device reconfigures a TTL set value due to broken link or change of routing, wherein the processing unit further:

receives a data packet from the mobile terminal prior to sending the heartbeat packet, wherein the address mapping relationships for the mobile terminal comprises information concerning a mapping of a source address of the data packet to a source address of the edge NAT router and a mapping of a destination address of the data packet to a destination address of the mobile terminal, detects a present TTL value of the data packet when receiving the data packet;

acquires the number of the hops by subtracting the present TTL value from a standard TTL value of the data packet;

configures an initial TTL value of the heartbeat packet to an addition result of the number of the hops and an adjustment offset; and adjusts the initial TTL value of the heartbeat packet by performing a send-response communication with the mobile terminal, until acquiring a TTL value of the heartbeat packet that the mobile terminal cannot receive the heartbeat packet, thereby using the TTL value as the TTL set value, wherein the send-response communication comprises:

sending, by the computing device, the heartbeat packet including the initial TTL value to the mobile terminal;

sending, by the mobile terminal, a response packet back to the computing device in response to receiving the heartbeat packet;

decreasing, by the computing device, the initial TTL value of the heartbeat packet by 1 after receiving the response packet; and repeating, by the computing device, the steps of sending the heartbeat packet and decreasing the initial TTL value of the heartbeat packet, until no response packet corresponding to the sent heartbeat packet is received from the mobile terminal.

13. The mobile terminal as claimed in claim 12, wherein the TTL set value of the heartbeat packet is configured to a number of hops for the data packet to pass through the edge NAT router and the other routers and reach the computing device.

14. The mobile terminal as claimed in claim 12, wherein each of the other routers decreases the TTL set value of the heartbeat packet by 1 when rerouting the heartbeat packet, and the heartbeat packet is discarded by the edge NAT router in response to the TTL set value being decreased progressively to 0 when the data packet reaches the edge NAT router, so that the heartbeat packet only serves a purpose to maintain the address mapping relationships for the mobile terminal in the edge NAT router.

* * * * *